US006836718B2

(12) United States Patent
Hasfjord et al.

(10) Patent No.: US 6,836,718 B2
(45) Date of Patent: Dec. 28, 2004

(54) VEHICLE WITH ENGINE IDLE-MANAGEMENT SYSTEM

(75) Inventors: Lawrence D. Hasfjord, Fort Wayne, IN (US); Michael P. Harding, Fort Wayne, IN (US); Kenneth Bultemeier, Jr., Fort Wayne, IN (US); Richard S. Justice, Fort Wayne, IN (US)

(73) Assignee: International Truck Intellectual Property Company, LLC, Warrensville, IL (US)

( * ) Notice: Subject to any disclaimer, the term of this patent is extended or adjusted under 35 U.S.C. 154(b) by 0 days.

(21) Appl. No.: 10/408,505

(22) Filed: Apr. 7, 2003

(65) Prior Publication Data

US 2004/0199308 A1 Oct. 7, 2004

(51) Int. Cl.[7] .............................................. G06F 19/00
(52) U.S. Cl. ..................... 701/54; 701/112; 123/339.1; 123/339.18; 123/339.24
(58) Field of Search ............................... 701/36, 53–54, 701/103, 112–113; 123/339.1, 339.14, 339.16, 339.17, 339.18, 339.22, 339.24

(56) References Cited

U.S. PATENT DOCUMENTS

| | | | | |
|---|---|---|---|---|
| 4,694,798 A | * | 9/1987 | Kato et al. ............. | 123/339.17 |
| 5,619,412 A | * | 4/1997 | Hapka ....................... | 701/36 |
| 5,852,995 A | * | 12/1998 | Aoki et al. ............. | 123/339.16 |
| 6,247,446 B1 | * | 6/2001 | Fassler et al. .......... | 123/339.22 |
| 6,275,759 B1 | * | 8/2001 | Nakajima et al. .......... | 701/54 |
| 6,308,129 B1 | * | 10/2001 | Uchida ..................... | 701/112 |
| 6,488,005 B2 | * | 12/2002 | Kim ....................... | 123/339.16 |
| 6,540,644 B2 | * | 4/2003 | Morimoto et al. ......... | 477/102 |
| 6,556,910 B2 | * | 4/2003 | Suzuki et al. ............. | 701/54 |

* cited by examiner

Primary Examiner—Gary Chin
(74) Attorney, Agent, or Firm—Jeffrey P. Calfa; Dennis Kelly Sullivan; Susan L. Lukasik

(57) ABSTRACT

A vehicle according to the present invention has an internal combustion engine that is controlled by an engine-control computer that is operable, when the vehicle is parked, to operate in an idle-management mode to automatically start and stop idling operation of the internal combustion engine in order to maintain desirable electrical system energy levels, maintain desirable fluid temperatures of the internal combustion engine, and/or enable maintenance of comfortable occupant cabin temperatures. Each vehicle according to the present invention has a unique configuration of safety-interlock provisions that affect when and if an idle-management mode of operation of the engine-control computer is initiated and/or maintained.

7 Claims, 3 Drawing Sheets

VEHICLE WITH ENGINE IDLE-MANAGEMENT SYSTEM

BACKGROUND OF THE INVENTION

The present invention relates to vehicles that have computerized engine control systems that automatically start and stop idling of the vehicle's internal combustion engine during driver rest periods.

DRAWINGS

Other objects and advantages of the invention will become more apparent upon perusal of the detailed description thereof and upon inspection of the drawings in which.

DETAILS OF INVENTION

Figure 1:
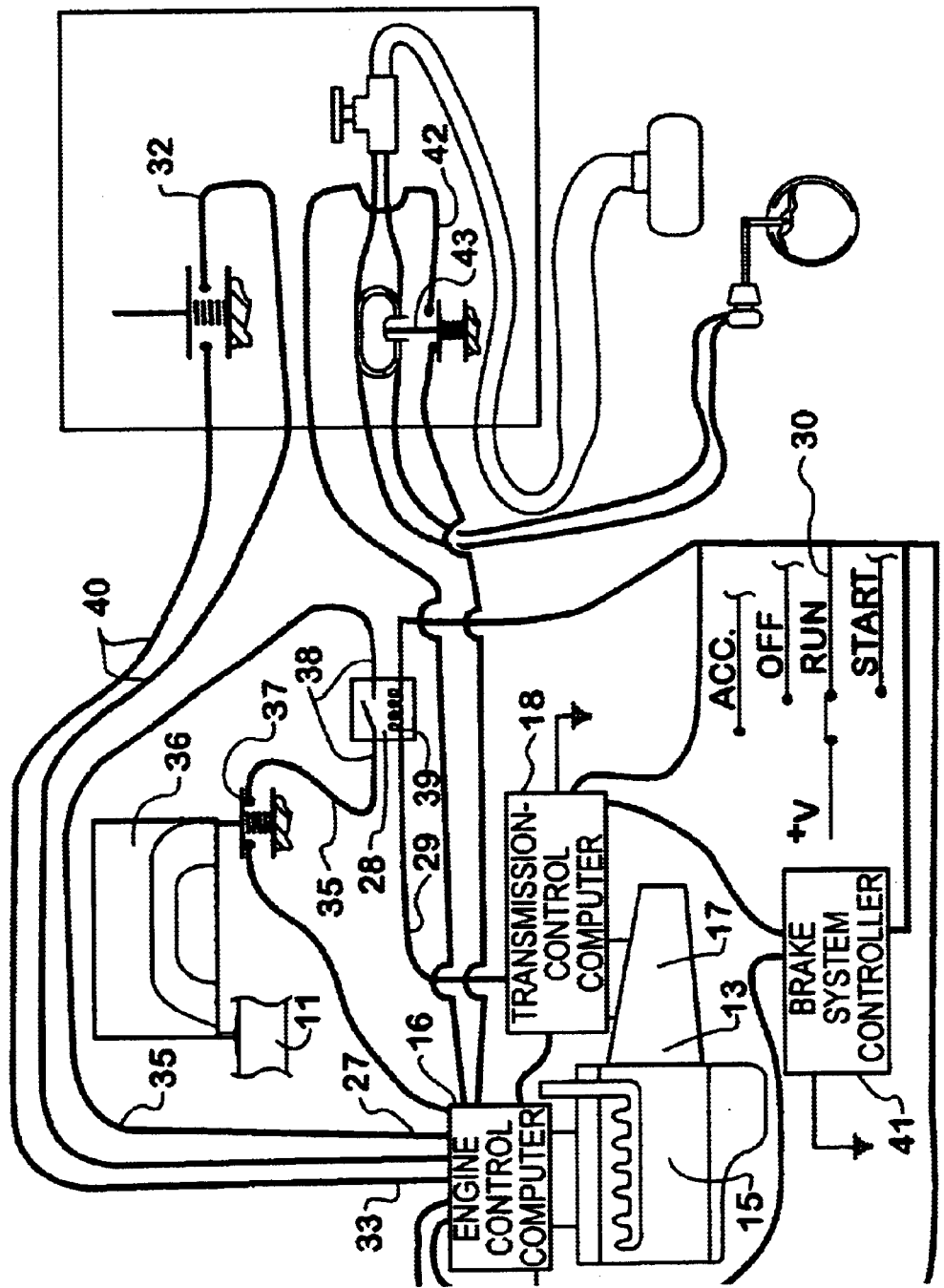
FIG. 1 is a schematic illustration of many of the systems of a vehicle according to the present invention that are particularly related to the invention and how those systems are interacted with one another.

Referring now to the drawings, the present invention is a vehicle 10 for moving cargo and/or occupants. A vehicle 10 according to the present invention comprises one or more rigid and strong frame structures 11 to which a majority of other components of the vehicle 10 are directly or indirectly engaged and from which a majority of other components of the vehicle 10 derive support directly or indirectly. A vehicle 10 according to the present invention further comprises a suspension system 12 that is engaged to the one or more frame structures 11 and supports them above the ground. The suspension system 12 also provides the vehicle 10 with a relatively low resistance to movement along the ground. A vehicle 10 according to the present invention also comprises an occupant cabin 14 that is supported from the one or more frame structures 11 and within which an operator of the vehicle 10 may reside and be isolated from the environment while operating the vehicle 10 or resting. A vehicle 10 according to the present invention further comprises a powertrain 13 that is operable to drive the vehicle 10 along the ground. The powertrain 13 of a vehicle 10 according to the present invention comprises an internal combustion engine 15 that provides power and downstream components that transfer the power provided by the internal combustion engine 13 to the ground. A vehicle 10 according to the present invention further comprises an engine-control computer 16 that controls one or more aspects of operation of the internal combustion engine 15. One of the downstream components of the powertrain 13 of the vehicle 10 is a selectable-ratio power transmission 17 that is operable to receive power from the internal combustion engine 15 through rotation of an input shaft of the selectable-ratio power transmission 17 and to transmit that power to an output shaft of the selectable-ratio power transmission by rotating the output shaft at one of a predetermined group of speed ratios relative to the input shaft. The selectable-ratio power transmission 17 of a vehicle 10 according to the present invention also has a neutral operating state in which its output shaft is decoupled from its input shaft and driving of its input shaft causes no rotation of its output shaft. The selectable-ratio power transmission 17 of a vehicle 10 according to the present invention also comprises a clutch system for selectively coupling or decoupling the input shaft of the selectable-ratio power transmission 17 and an output shaft of the internal combustion engine 15. A vehicle 10 according to the present invention also includes a transmission-control computer 18 that is operable to control whether or not the input shaft and output shaft of the selectable-ratio power transmission are directly or indirectly coupled and, if so, at which of the predetermined group of speed ratios the output shaft of the selectable-ratio power transmission 17 rotates relative to the input shaft of the selectable-ratio power transmission 17. In the present invention the transmission-control computer 18 is also operable to control operation of the clutch system of the selectable-ratio power transmission 17 to couple or decouple the output shaft of the internal combustion engine 15 and the input shaft of the selectable-ratio power transmission 17. Accordingly, the clutch system of a vehicle 10 according to the present invention does not include a traditional clutch pedal. It should be understood that the transmission-control computer 18 and the engine-control computer 16 may be one and the same computing device or they may be constituted by any number of different combinations of computing devices in communication with one another.

The engine-control computer 16 of a vehicle 10 according to the present invention operates according to engine-control logic that includes an idle-management mode of operation for utilization when the vehicle 10 is parked. When the engine-control computer 16 is operating in an idle-management mode of operation, the engine-control computer 16 automatically starts and stops idling operation of the internal combustion engine 15 in order to achieve one or more benefits of idling operation of the internal combustion engine 15 without incurring the cost of extended, uninterrupted idling operation of the internal combustion engine 15. One of the benefits of idling operation of the internal combustion engine 15 is the production of electrical energy for use in powering electrical systems of the vehicle 10. In some embodiments of the present invention the engine-control computer 16, when operating in idle-management mode, will monitor the energy level of an electrical system of the vehicle 10 in order to determine when to start idling operation of the internal combustion engine 15 and when to terminate idling operation of the internal combustion engine 15. In such embodiments of the present invention, when the engine-control computer 16 is operating in idle-management mode and the energy level of the electrical system of the vehicle 10 drops below a predetermined lower level, the engine control computer 15 automatically starts the internal combustion engine 15 in order to commence recharging of the energy level of the electrical system. In such embodiments of the present invention, when the engine-control computer 16 is operating in an idle-management mode and idling operation of the internal-combustion engine 15 has resulted in the energy level of the electrical system reaching a predetermined satisfactory level and there are no other conditions (such as engine-fluid temperatures and/or occupant cabin temperatures that are deviant from optimum) that make it desirable to continue idling operation of the internal combustion engine, the engine-control computer 16 shuts down the internal combustion engine. Another benefit of idling operation of the internal combustion engine 15 is maintenance of desirable temperature levels of various fluids of the internal combustion engine 16. In some embodiments of the present invention the engine-control computer 16, when operating in idle-management mode, will monitor the temperature levels of one or more of the fluids of the internal combustion engine 15 in order to determine when to effect idling operation of the internal combustion engine 15 and when to effect shut-down of the internal combustion engine 15. In such embodiments of the present invention, when the engine-control computer 16 is operating in idle-management mode and the temperature level of one or more fluids of the internal combustion engine drops below a predetermined lower level, the engine control computer 15 automatically starts the internal combustion engine 15 in order to cause warming of the fluid(s) of the internal combustion engine 15. In such embodiments of the present invention, when the engine-control computer 16 is operating in an idle-management mode and idling operation of the internal-combustion engine 15 has resulted in the temperature levels of fluids of the internal combustion engine reaching a predetermined satisfactory level and there are no other conditions (such as electrical-system energy levels and/or occupant cabin temperatures that are deviant from optimum) that make it desirable to continue idling operation of the internal combustion engine, the engine-control computer 16 shuts down the internal combustion engine. Another benefit of idling operation of the internal combustion engine 15 is that it enables maintenance of proper temperature levels inside the occupant cabin 14 by supporting proper operation of a heating system or an air conditioning system of the vehicle 10. In some embodiments of the present invention the engine-control computer 16, when operating in idle-management mode, will directly or indirectly monitor the temperature level of the environment in the occupant cabin 14 in order to determine when to effect idling operation of the internal combustion engine 15 and when to shut-down the internal combustion engine 15. In such embodiments of the present invention, when the engine-control computer 16 is operating in idle-management mode and the temperature of the environment in the occupant cabin 14 reaches an HVAC trigger temperature, the engine control computer 15 automatically starts the internal combustion engine 15 in order to support operation of the heating system or air conditioning system. In such embodiments of the present invention, when the engine-control computer 16 is operating in an idle-management mode and idling operation of the internal-combustion engine 15 in combination with operation of the heating system or the air conditioning system has resulted in the temperature levels of the occupant cabin 14 reaching an HVAC shut-down temperature and there are no other conditions (such as engine-fluid temperatures and/or electrical system energy levels that are deviant from optimum) that make it desirable to continue idling operation of the internal combustion engine, the engine-control computer 16 will automatically shut down the internal combustion engine 15.

It is generally desirable that certain circumstances exist when the engine-control computer 16 is operating in idle-management mode. Accordingly, the engine-control logic, according to which the engine-control computer 16 of a vehicle 10 according to the present invention operates, is such that certain signal combinations must be received by the engine-control computer 16 in order for an idle-management mode of operation to be initiated and/or maintained. Of course the engine-control computer 16 must receive some indication that an operator of the vehicle 10 desires to instigate operation of the engine-control computer 16 in an idle-management mode before operation in an idle-management mode will be initiated. A vehicle 10 according to the present invention and the engine-control logic may have any number of different provisions for enabling an operator to signal to the engine-control computer 16 that the operator wishes the engine-control computer 16 to enter an idle-management mode. In the first commercial implementation of the present invention the engine-control computer 16 is communicatively linked to cruise controls of the vehicle 10 and toggling of a cruise control on/off selector from an off state to an on state and back to an off state, when the vehicle 10 is parked, is interpreted by the engine-control computer 16 as a request from the operator that the engine-control computer 16 enter an idle-management mode of operation.

Figure 2:
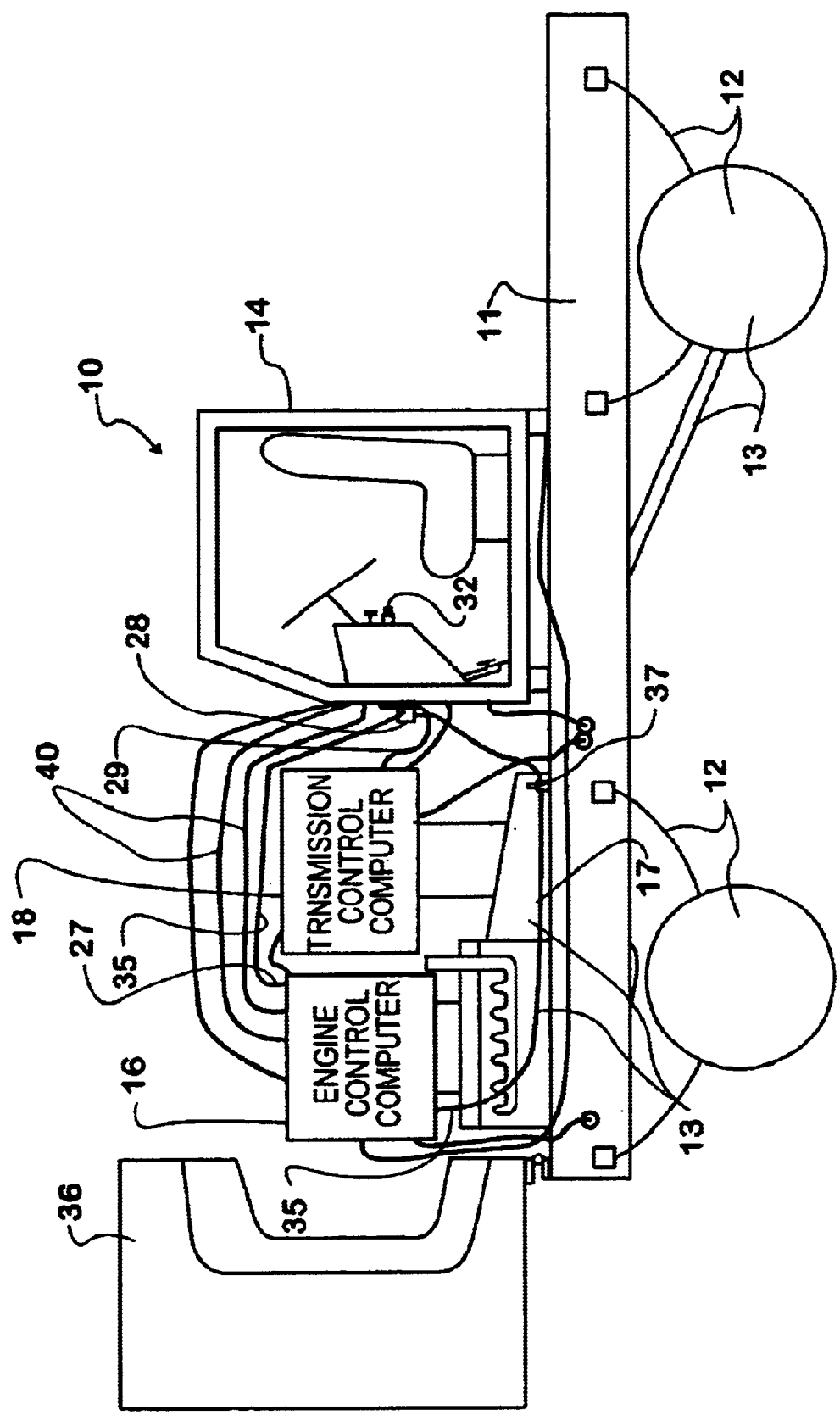
FIG. 2 is a side elevation of a vehicle according to the present invention with its engine-compartment hood disposed in the open position.
Figure 3:
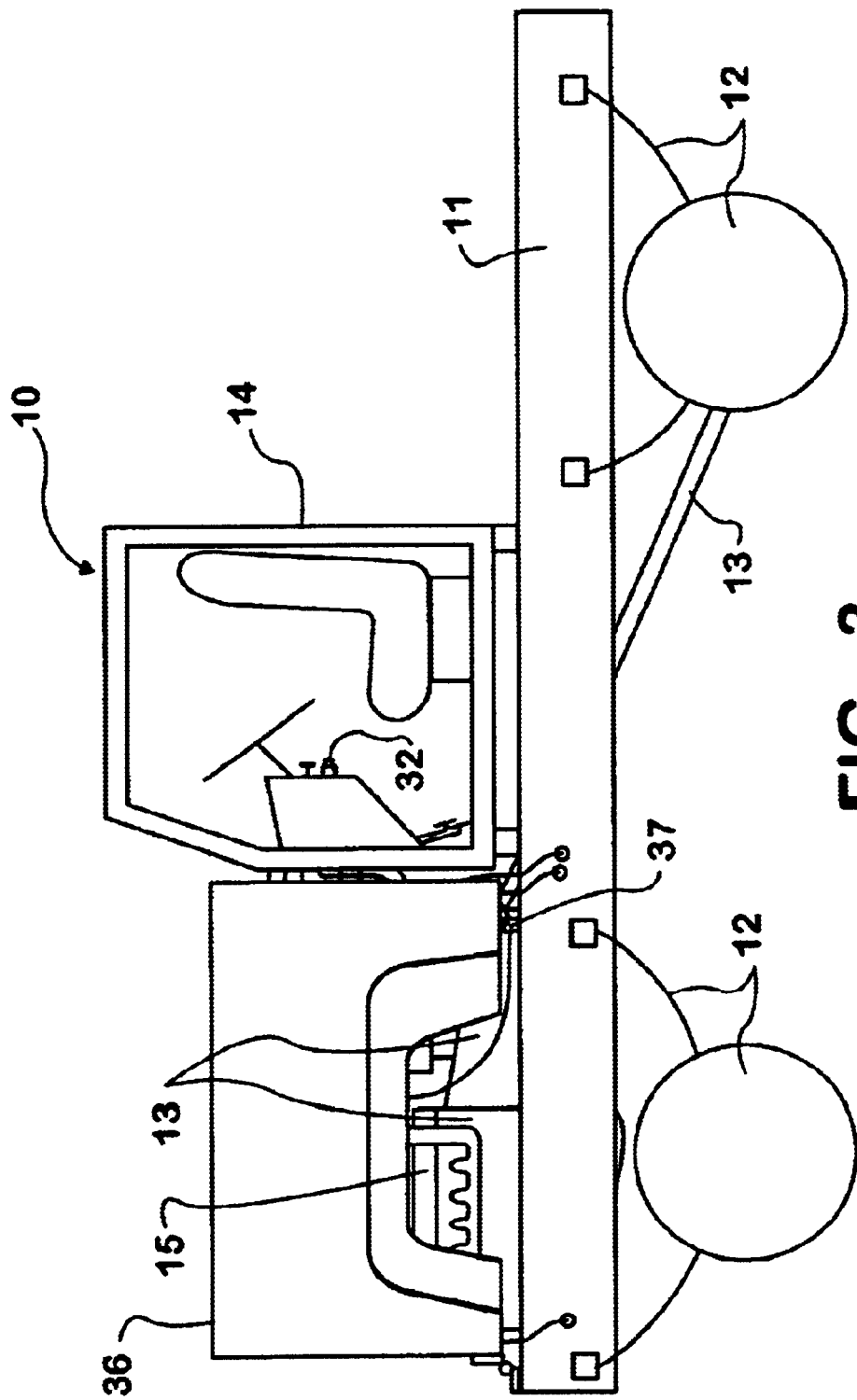
FIG. 3 is a side elevation of a vehicle according to the present invention with its engine-compartment hood disposed in the closed position.

In some embodiments the engine-control logic is such that the selectable-ratio power transmission 17 must have a neutral operating state and an engine-compartment hood 36 must be in its closed position, as it is in FIGS. 1 and 2, in order for operation of the engine-control computer 16 in an idle-management mode to be enabled. As is illustrated in FIGS. 1 and 2, in such embodiments of the present invention the vehicle 10 includes a safety-interlock circuit 35 that is connected to a safety-interlock input channel 27 of the engine-control computer 16 and through which a safety-interlock signal is transmitted. In such embodiments, the engine-control logic is configured in such a manner that receipt of a safety-interlock signal by the engine-control computer 16 through the safety-interlock input channel 27 is required for the engine-control computer 16 to operate in an idle-management mode. The construction of the safety-interlock circuit 35 of the first commercial implementation of the present invention is such that the engine-compartment hood 36 must be in its closed position and the selectable-ratio power transmission 17 must have a neutral operating state in order for a safety-interlock signal to be transmitted through the safety-interlock circuit 35 to the safety-interlock input channel 27 of the engine-control computer 16. In this embodiment, the safety-interlock circuit 35 comprises a hood-tilt switch 37 that is interacted with the engine-compartment hood 36 in such a manner that the hood-tilt switch 37 is closed and a safety-interlock signal can be transmitted therethrough, when the engine-compartment hood 36 is in its closed position. The interaction of the hood-tilt switch 37 of this embodiment with the engine-compartment hood 36 is further such that when the engine-compartment hood 36 is disposed in its open position the hood-tilt switch 37 is open and transmission of a safety-interlock signal through the safety-interlock circuit 35 to the engine-control computer 16 is prevented. In some embodiments of the present invention the selectable-ratio power transmission 17 or the transmission-control computer 18 comprises a transmission-neutral output terminal 29 that is connected to ground voltage level of the vehicle's electrical system when the selectable-ratio power transmission 17 has a neutral operating state. In such embodiments, the safety-interlock circuit 35 also comprises a normally-open transmission-neutral relay 28 that has its switched terminals 38 connected in series with the hood-tilt switch 37 and the safety-interlock input channel 27. In such embodiments the switching circuit 39 of the normally-open transmission-neutral relay 28, the existence or absence of electrical current flowing through which controls whether or not the switched terminals 38 are connected or disconnected, is connected in series between the transmission-neutral output terminal 29 and an ignition-switched voltage source. Thus, in embodiments in which a normally-open transmission-neutral relay 28 is connected as is described above to the other systems of the vehicle, when the vehicle's ignition switch is in the "on" position and the selectable-ratio power transmission 17 has a neutral operating state, the switched terminals 38 of the normally-open transmission-neutral relay are connected to one another and a safety-interlock signal can be transmitted through the safety-interlock circuit 35 provided that all other safety-interlock switches of the safety-interlock circuit 35 are also closed. Corollarily, when the vehicle's ignition switch is not in the "on" position and/or the selectable-ratio power transmission 17 has an operating state other than neutral, the switched terminals 38 of the normally-open transmission-neutral relay 28 are disconnected and transmission of a safety-interlock signal through the safety-interlock circuit 35 is prevented. As was alluded to above, other safety-interlock switches could be included in the same safety-interlock circuit 35 as a hood-tilt switch 37 and a normally-open transmission-neutral relay 28. Additionally there may be other safety-interlock circuits in addition to one that includes a hood-tilt switch 37 and a normally-open transmission-neutral relay 28.

Another factor that is important in determining whether or not initiation and/or maintenance of an idle-management mode of operation of the engine-control computer 16 is appropriate is whether or not a park brake of the vehicle 10 is set. Accordingly, as is illustrated schematically in FIG. 1, in some embodiments of the present invention, the vehicle 10 includes a park-brake status circuit 42. In many such embodiments the park-brake status circuit 42 is connected to a park-brake status input channel 43 of the engine-control computer 16 and interacted with the park-brake system of the vehicle 10 in such a manner to communicate a park-brake status signal, the value of which is interpretable to determine whether or not the park-brake of the vehicle 10 is set or released, to the engine-control computer 16. In many such embodiments of the present invention the engine-control logic is such that an idle-management mode of operation of the engine-control computer 16 is only enabled when the park-brake system of the vehicle 10 is set. The construction of a park-brake status circuit 42 and its interaction with the park-brake system and engine-control computer 16 may take on many different forms that are well-known to and/or easily imaginable by a person of ordinary skill in the art and that would effect the above-described functionality. One example of how a park-brake status switch 43 may be interacted with the park-brake system is illustrated schematically in FIG. 1. In the embodiment illustrated in FIG. 1, the park-brake system includes a park-brake mechanism that is spring applied and air released. In this embodiment, the park-brake status switch 43 is a pressure-actuated switch disposed in the air pressure line that controls whether the park brake is set or released.

In some constructions of vehicles the engine-control logic is configured such that, subsequent to an operator taking whatever measures are prescribed for signaling a desire that the engine-control computer 16 operate in an idle-management mode, a clutch-state signal must change from a first value to a second value and back to the first value again before the engine-control logic will allow initiation of an idle-management mode. In such cases, which include the embodiment schematically illustrated in FIG. 1 and many other embodiments of the present invention, the clutch-state signal is received at a clutch-state input channel 33 of the engine-control computer 16 from a clutch-state circuit 40. In many vehicle constructions, none of which are illustrated in the drawings, the clutch-state circuit 40 includes a clutch-pedal switch that is connected to the clutch-state input channel of an engine-control computer and the clutch-pedal switch is interacted with a clutch pedal of the vehicle in such a manner that the clutch-pedal switch has a state when the clutch pedal is depressed and a second state when the clutch pedal is released. In such cases, when an operator is instigating an idle-management mode of operation of the engine-control computer 16, the clutch-state signal received by the engine-control computer 16 has a first value when the clutch pedal is not depressed and the operator can meet the requirement of the engine control logic that the clutch-state signal change from that first value to a second value and back to the first value again by depressing and then releasing the clutch pedal. As was mentioned above, in many embodiments of a vehicle 10 according to the present invention, the transmission-control computer 18 is empowered to control the clutch system of the selectable-ratio power transmission 17 and, accordingly, the vehicle 10 does not include a clutch pedal. As is illustrated in FIGS. 1 and 2, in such embodiments, the clutch-state circuit 40 includes a dummy clutch switch 32 that is connected to the clutch-state input channel 33 and that is mounted within the occupant cabin 14 of the vehicle 10. In such embodiments, when instigating an idle-management mode of operation of the engine-control computer 16, an operator may change the clutch-state signal from a first value to a second value and back to a first value by changing the operating state of the dummy clutch switch 32 from a first state to a second state and back to a first state. A dummy clutch switch 32 may have any of a number of different constructions. In the first commercial implementation of the present invention the dummy clutch switch 32 is a spring-loaded momentary switch that assumes a first operating state in which it is closed, unless its switch actuator is depressed, at which time it assumes a second operating state which is open. Accordingly, in the first commercial implementation of the present invention, when the dummy clutch switch's 32 actuator is not depressed the clutch-state signal has a first value and an operator may subsequently cause the clutch-state signal to change from that first value to a second value and back to the first value again by depressing and subsequently releasing the actuator of the dummy clutch switch 32. It is worth mentioning that in some embodiments of the present invention, including the first commercial implementation thereof, the engine-control logic may be such that, in order to instigate an idle-management mode of operation, an operator must execute other actions at prescribed times, including after changing the state of the dummy clutch switch 32 from its first state to its second and before changing the state of the dummy clutch switch 32 back to its first state, relative to particular manipulations of the dummy clutch switch 32.

In some embodiments of the present invention it will be necessary for the transmission-control computer 18 to communicate with other systems of the vehicle 10 for an idle-management mode of operation of the engine-control computer 16 to be properly initiated and maintained. Accordingly, in such embodiments of the present invention, the transmission-control computer 18 must be supplied with electrical power in order to enable such communication in support of proper initiation and maintenance of an idle-management mode of operation of the engine-control computer 16. As is best seen in FIG. 1, in such embodiments of the present invention the transmission-control computer 18 is supplied electrical power by an ignition-switched voltage source.

In some embodiments of the present invention the vehicle 10 comprises an anti-lock brake system controller 41 that must be in communication with other systems of the vehicle 10 for an idle-management mode of operation of the engine-control computer 16 to be properly initiated and maintained. Accordingly, in such embodiments of the present invention, the anti-lock brake system controller 41 must be supplied with electrical power in order to enable such communication in support of proper initiation and maintenance of an idle-management mode of operation of the engine-control computer 16. In such embodiments of the present invention the anti-lock brake system controller 41 is supplied electrical power by an ignition-switched voltage source.

It will, of course, be understood that a vehicle according to the present invention could be of any of a number of different constructions within the guidelines set forth above and that some features of the invention could be employed without a corresponding use of other features.

We claim:

1. A vehicle, comprising:
   (a) one or more rigid and strong frame structures to which a majority of other components of said vehicle are directly or indirectly engaged and from which said majority of other components of said vehicle derive support directly or indirectly;
   (b) a suspension system that is engaged to and supports said one or more frame structures above the ground and that provides the vehicle with a relatively low resistance to movement along the ground;
   (c) an occupant cabin that is engaged to and supported by said one or more frame structures and within which occupants of said vehicle may reside;
   (d) a powertrain for driving said vehicle along the ground;
   (e) wherein said powertrain comprises an internal combustion engine for supplying power to downstream components of said powertrain in order to drive said vehicle along the ground;
   (f) wherein said powertrain comprises a selectable-ratio power transmission with a clutch system for selectively coupling and decoupling an input shaft of said selectable-ratio power transmission and an output shaft of said internal combustion engine;
   (g) wherein said selectable-ratio power transmission comprises an output shaft;
   (h) wherein said selectable-ratio power transmission is constructed such that said output shaft of said selectable-ratio power transmission can be selectively coupled to said input shaft of said selectable-ratio power transmission at one of plurality of speed ratios;
   (i) wherein said selectable-ratio power transmission is further constructed such that said output shaft of said selectable-ratio power transmission can be decoupled from said input shaft of said selectable-ratio power transmission to effect a neutral operational state of said selectable-ratio power transmission;
   (j) a transmission-control computer that is operable to either effect coupling of said output shaft of said selectable-ratio power transmission to said input shaft of said selectable-ratio power transmission at one of said speed ratios or to effect said neutral operational state of said selectable-ratio power transmission in which said output shaft of said selectable-ratio power transmission is decoupled from said input shaft of said selectable-ratio power transmission;
   (k) an engine-control computer that is operable in an idle-management mode of operation to automatically start end stop idling operation of said internal combustion engine in a manner dependent upon one or more of an electrical system energy level, one or more engine fluid temperatures, and an internal temperature of said occupant cabin;
   (l) wherein engine-control logic according to which said engine-control computer operates requires that said engine-control computer be receiving a safety-interlock signal, which is received through a safety-interlock input channel of said engine-control computer, before said engine-control computer will operate in said idle-management mode of operation;
   (m) wherein a hood-tilt switch and switched terminals of a normally-open transmission-neutral relay are connected in series with said safety-interlock input channel such that said safety-interlock signal must be transmitted to said safety-interlock input channel through said hood-tilt switch and said switched terminals of said normally-open transmission-neutral relay;
   (n) wherein said selectable-ratio power transmission or said transmission-control computer comprises a transmission-neutral output terminal that is connected to ground voltage level of an electrical system of said vehicle when said selectable-ratio power transmission has a neutral operating state; and
   (o) wherein a switching circuit of said normally-open transmission-neutral relay is connected on one side to an ignition-switched voltage source and on an opposite side to said transmission-neutral output terminal.

2. The vehicle of claim 1, wherein:
   (a) said engine-control logic is such that a clutch-state signal, which is received through a clutch-state input channel of said engine-control computer, must change from a first value to a second value and back to said first value in order for said engine-control computer to enter said idle-management mode of operation; and
   (b) said vehicle further comprises a dummy clutch switch mounted within said occupant cabin of said vehicle and connected to said clutch-state input channel of said engine-control computer.

3. The vehicle of claim 2, wherein:
   (a) said transmission-control computer receives electrical power from an ignition-switched voltage source.

4. The vehicle of claim 3, wherein:
   (a) said vehicle comprises an anti-lock brake system controller that is communicatively linked to said transmission-control computer or said engine-control computer; and
   (b) said anti-lock brake system controller receives electrical power from said ignition-switched voltage source.

5. A vehicle, comprising:
   (a) one or more rigid and strong frame structures to which a majority of other components of said vehicle are directly or indirectly engaged and from which said majority of other components of said vehicle derive support directly or indirectly;
   (b) a suspension system that is engaged to arid supports said one or more frame structures above the ground and that provides said vehicle with a relatively low resistance to movement along the ground;
   (c) an occupant cabin that is engaged to and supported by said one or more frame structures and within which occupants of said vehicle may reside;
   (d) a powertrain for driving said vehicle along the ground;
   (e) wherein said powertrain comprises an internal combustion engine for supplying power to downstream components of said powertrain in order to drive said vehicle along the ground;
   (f) wherein said powertrain comprises a selectable-ratio power transmission with a clutch system for selectively coupling and decoupling an input shaft of said selectable-ratio power transmission and an output shaft of said internal combustion engine;

(g) wherein said selectable-ratio power transmission comprises an output shaft;

(h) wherein said selectable-ratio power transmission is constructed such that said output shaft of said selectable-ratio power transmission can be selectively coupled to said input shaft of said selectable-ratio power transmission at one of a plurality of speed ratios;

(i) wherein said selectable-ratio power transmission is further constructed such that said output shaft of said selectable-ratio power transmission can be decoupled from said input shaft of said selectable-ratio power transmission to effect a neutral operational state of said selectable-ratio power transmission;

(j) a transmission-control computer that is operable to either effect coupling of said output shaft of said selectable-ratio power transmission to said input shaft of said selectable-ratio power transmission at one of said speed ratios or to effect said neutral operational state of said selectable-ratio power transmission in which said output shaft of said selectable-ratio power transmission is decoupled from said input shaft of said selectable-ratio power transmission;

(k) wherein said transmission-control computer is further operable to control said clutch system to couple/decouple said input shaft of said selectable-ratio power transmission to/from said output shaft of said internal combustion engine;

(l) an engine-control computer that is operable in an idle-management mode of operation to automatically start and stop idling operation of said internal combustion engine in a manner dependent upon one or more of an electrical system energy level, one or more engine fluid temperatures, and an internal temperature of said occupant cabin;

(m) wherein engine-control logic according to which said engine-control computer operates is such that a clutch-state signal, which is received through a clutch-state input channel of said engine-control computer, must change from a first value to a second value and back to a first value in order for said engine-control computer to enter said idle-management mode of operation; and (n) wherein said vehicle further comprises a dummy clutch switch mounted within said occupant cabin of said vehicle and connected to said clutch-state input channel of said engine-control computer.

6. The vehicle of claim 5, wherein:

(a) said transmission-control computer receives electrical power from an ignition-switched voltage source.

7. The vehicle of claim 6, wherein:

(a) said vehicle comprises an anti-lock brake system controller that is communicatively linked to said transmission-control computer or said engine-control computer; and (b) said anti-lock brake system controller receives electrical power from said ignition-switched voltage source.

* * * * *